(12) United States Patent
Satran et al.

(10) Patent No.: US 8,616,866 B2
(45) Date of Patent: Dec. 31, 2013

(54) APPARATUS AND METHOD FOR MANUFACTURING CUTTING INSERTS

(75) Inventors: Amir Satran, Kfar Vradim (IL); Alexander Zibenberg, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 13/445,674

(22) Filed: Apr. 12, 2012

(65) Prior Publication Data

US 2013/0039798 A1 Feb. 14, 2013

(30) Foreign Application Priority Data

Aug. 14, 2011 (IL) .......................................... 214642

(51) Int. Cl.
B29C 43/04 (2006.01)

(52) U.S. Cl.
USPC ... 425/78; 425/348 S; 425/356; 425/DIG. 58; 425/317; 419/66

(58) Field of Classification Search
USPC ......... 425/78, 348 S, 344–345, DIG. 58, 356; 419/66
See application file for complete search history.

(56) References Cited

U.S. PATENT DOCUMENTS

| | | | |
|---|---|---|---|
| 5,333,972 A | | 8/1994 | Bernadic et al. |
| 6,156,265 A | * | 12/2000 | Sugimoto ....................... 425/78 |
| 6,238,146 B1 | | 5/2001 | Satran et al. |
| 7,560,068 B2 | * | 7/2009 | Smilovici et al. ............... 419/66 |
| 7,829,015 B2 | * | 11/2010 | Kuplen et al. ................... 425/78 |
| 7,909,544 B2 | | 3/2011 | Jansson |
| 2007/0292219 A1 | | 12/2007 | Craig |
| 2009/0136776 A1 | | 5/2009 | Gubanich et al. |
| 2009/0155004 A1 | | 6/2009 | Jansson |
| 2010/0159051 A1 | | 6/2010 | Gubanich et al. |

FOREIGN PATENT DOCUMENTS

| | | |
|---|---|---|
| EP | 0 769 341 | 4/1997 |
| JP | 2009-256723 | 11/2009 |
| SU | 1748939 A1 | 7/1992 |

OTHER PUBLICATIONS

International Search Report dated Dec. 14, 2012 issued in PCT counterpart application (No. PCT/IL2012/050260).

* cited by examiner

*Primary Examiner* — Joseph S Del Sole
*Assistant Examiner* — Thukhanh Nguyen
(74) *Attorney, Agent, or Firm* — Womble Carlyle (57) ABSTRACT

A method for manufacturing a cutting insert green body from a sinterable powder, a tool set for manufacturing the cutting insert green body by that method and the green body manufactured by the tool set. The tool set has axially moving upper and lower punches and radially moving side punches. The side punches move slidably on die rods. The side punches and die rods move in channels in a base body on which a cover plate is mounted. The upper and lower punches move in through holes in the cover plate and base body, respectively. The die rods are stationary during compaction of the sinterable powder. The upper, lower and side punches form surfaces of the green body and the die rods form some of the edges of the green body. The green body can have undercuts and the edges formed by the die rods can be non-linear in shape.

12 Claims, 5 Drawing Sheets

FIG.8

APPARATUS AND METHOD FOR MANUFACTURING CUTTING INSERTS

RELATED APPLICATIONS

The subject matter of the present application claims priority to IL 214642, filed Aug. 14, 2011, and is related to commonly owned U.S. patent application Ser. No. 13/341,768, filed Dec. 30, 2011.

FIELD OF THE INVENTION

The subject matter of the present application relates to a method and apparatus for manufacturing pre-sintered cutting insert green bodies, to be subsequently sintered into cutting inserts.

BACKGROUND OF THE INVENTION

Fabrication of cutting inserts from sinterable powders, i.e., metallurgical, cermets or ceramics powders, comprises compaction of the sinterable powder, with or without a fugitive binder, into a pre-sintered green body, and subsequent sintering of the green body to produce a cutting insert. Compaction generally takes place under high pressures obtained through large opposing forces generated by a system of punches in a die. For example, by upper and lower punches urged towards a die cavity formed in a die containing the sinterable powder, as is well known in the art. Although cutting inserts having undercut features may generally be pressed, these features may inhibit release and subsequent extraction of the compacted green body from the die cavity.

It is the object of the present invention to provide a new and improved apparatus and method for manufacturing pre-sintered cutting insert green bodies.

SUMMARY OF THE INVENTION

In accordance with a first aspect of the subject matter of the present application, there is provided a tool set configured to compact a sinterable powder to form a green body. In general, the sinterable powder can include a binder. The green body can be a cutting insert green body and after compaction the green body can be sintered to produce a cutting insert.

The tool set has a central axis which defines a reference axial direction. Radial directions are defined perpendicular to the central axis. The tool set comprises a base body having a base through hole, a plurality of radially directed punch channels, a plurality of radially directed die channels and a cover plate mountable on the base body. The cover plate has a plate through hole and the central axis passes through the base and plate through holes when the cover plate is mounted on the base body.

The tool set also comprises an upper punch, an opposing lower punch, a plurality of side punches and a plurality of die rods. The upper punch is axially moveable through the plate through hole and the lower punch is axially moveable through the base through hole. The side punches are arranged in opposing pairs of side punches, and are radially moveable in the punch channels. The die rods are radially moveable in the die channels. Each die rod is common to and located between two adjacent side punches. Each die rod has a forward die shaping surface and two die guiding surfaces on which the two adjacent side punches are slidably moveable. The die guiding surfaces diverge rearwardly from the die shaping surface.

In accordance with the subject matter of the present application, the tool set is configured to be adjusted from a first configuration prior to compaction of the sinterable powder to a second configuration after compaction of the sinterable powder. In the first configuration, the upper, lower and side punches form an initial closed cavity. The initial closed cavity may contain non-compacted sinterable powder. In the second configuration the upper lower and side punches and the die rods form a final closed cavity. The final closed cavity may contain compacted sinterable powder.

The upper, lower and side punches have, respectively upper, lower and side punch faces and the final closed cavity may be bounded by the upper, lower and side punch faces and by the die rod shaping surface.

In the first configuration the side punches are in a first position remote from the base through hole and in the second configuration the side punches are in a second position adjacent the base through hole. The arrangement being such that the die rods are located adjacent the base through hole in both the first and second configurations.

Compaction of the sinterable powder to form the green body may be effected by moving the upper and lower punches towards each other and by moving the side punches from the first position to the second position during which the die rods remain stationary adjacent the base through hole and the side punches move slidably on the die guiding surfaces. This arrangement is advantageous in that it ensures that the side punches will be guided to precise positions on either side of the respective die rods on the completion of the compaction of the sinterable powder.

In accordance with aspects of the subject matter of the present application, the die shaping surfaces of the die rods form minor edges of the green body. The die shaping surface can have any desired shape. The use of a die shaping surface provides a larger degree of freedom in the shapes of green body edges that can be manufactured in comparison with green body edges manufactured by prior art compaction tool sets.

In accordance with a specific embodiment of the subject matter of the present application, each minor edge comprises two minor cutting edges and in an end view of the green body the two minor cutting edges are non-collinear. In accordance with this specific embodiment, each minor edge is nonlinear in shape. Since the minor edge is formed by the die shaping surface, the die shaping surface will also be nonlinear in shape.

In accordance with a further specific embodiment of the subject matter of the present application, the green body comprises two opposing side surfaces and a peripheral surface extending between the two opposing side surfaces. The peripheral surface may comprise four identical end surfaces. Adjacent end surface may intersect at the minor edge.

In accordance with yet a further specific aspect of the subject matter of the present application, each side punch may have a protruding side punch face and the green body may have recessed end surfaces. The recessed end surfaces are formed by the protruding side punch faces during compaction of the sinterable powder.

In accordance with aspects of the subject matter of the present application, the upper punch has an upper punch face and the lower punch has a lower punch face, and the upper and lower punch faces form the side surfaces of the green body during compaction of the sinterable powder.

In accordance with a further aspect of the subject matter of the present application, there is provided a method for manufacturing a green body, the method comprising the steps of providing a tool set in accordance aspects of the subject matter of the present application as described hereinabove; establishing an initial closed cavity between the upper and lower punches, the side punches and the die rods, with a predetermined amount of sinterable powder located in the initial closed cavity; deriving a final closed cavity from the initial closed cavity by urging the upper and lower punches towards each other and by urging the side punches of opposing pairs of side punches towards each other with each two adjacent side punches moving slidably on the die guiding surfaces of the common die rod whilst maintaining the die rods stationary with respect to the side punches thereby compacting the sinterable powder to form the green body. To remove the green body the tool set is brought to a removal configuration by removing the upper punch and the cover plate from the base body, withdrawing the die rods and the side punches to a position remote from the green body and bringing the lower punch to a lower punch removal position wherein the lower punch protrudes from the base through hole thereby enabling removal of the green body.

In accordance with some embodiments, the method comprises the further step of producing a through bore in the green body.

The tool set may comprise a center pin in order to produce the through bore.

In accordance with yet a further aspect of the subject matter of the present application, there is provided a green body manufactured in accordance with the method of manufacture described above. The green body manufactured by this method, may comprise two opposing side surfaces and a peripheral surface extending between the two opposing side surfaces. The peripheral surface may comprise four identical end surfaces. Each end surface may extend between two adjacent end surfaces.

In accordance with some aspects of the present application, each end surface and each side surface may intersect at a major edge. At least a portion of the major edge may form a major cutting edge. Adjacent end surfaces may intersect at a minor edge. The minor edge may comprise two minor cutting edges.

In accordance with a specific embodiment of the present application, the end surfaces may be recessed.

In accordance with another specific embodiment of the present application, in an end view of the green body the two minor cutting edges may be non-collinear.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein.

Figure 1:
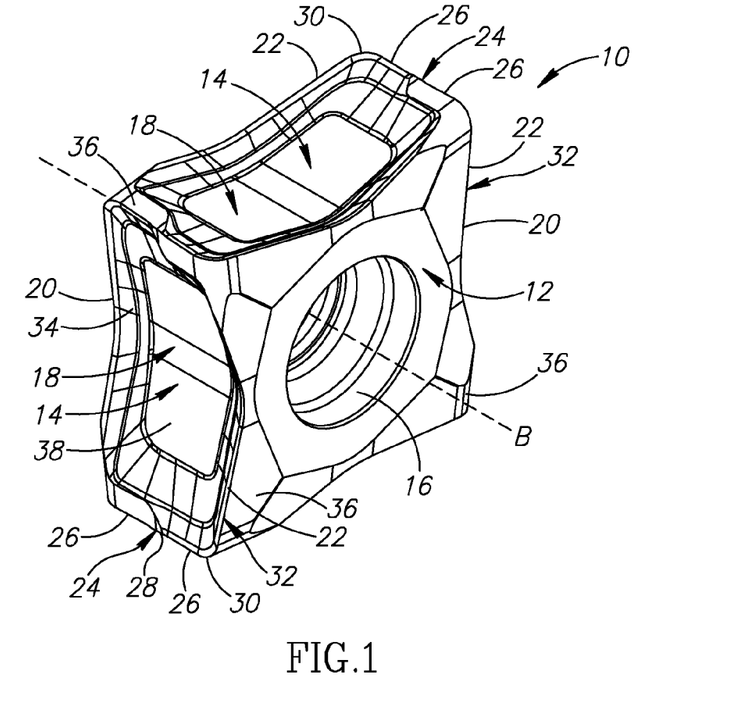
FIG. 1 is a perspective view of a green body manufactured in accordance with a method of the present invention.
Figure 2:
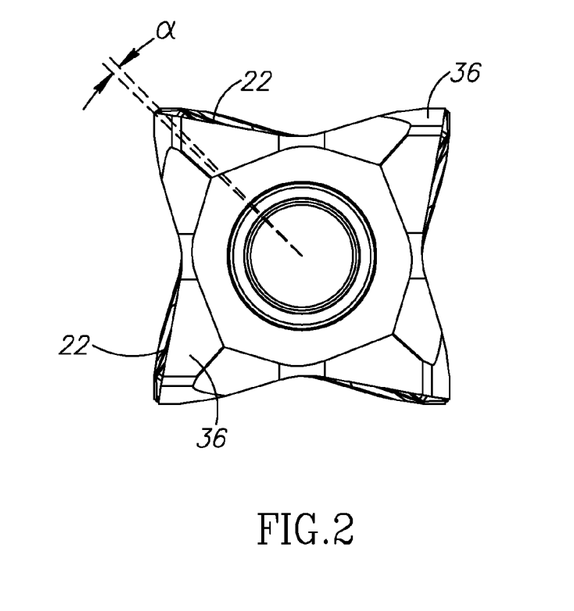
FIG. 2 is a side view of the green body shown in FIG. 1.
Figure 3:
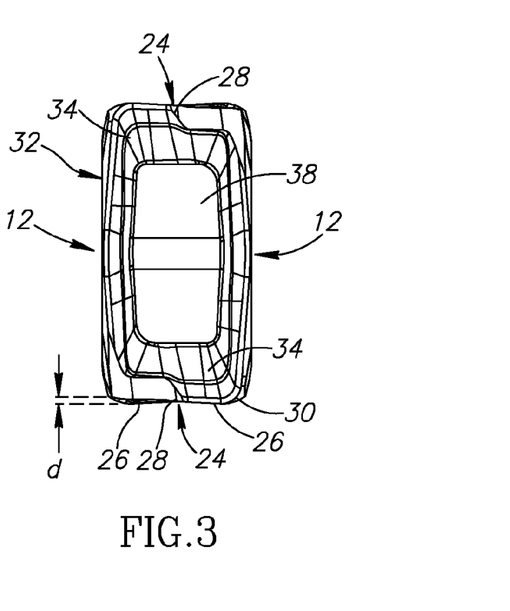
FIG. 3 is an end view of the green body shown in FIG. 1.

Attention is drawn to FIGS. 1 to 3 showing a nonbinding example of a pre-sintered cutting insert green body 10 formed by compaction of a sinterable powder in accordance with aspects of the subject matter of the present application. Sintering the green body 10 results in a cutting insert. The cutting insert may be used in metal cutting operations. The sinterable powder may be a metallurgical, ceramic or cermet powder mixed with a binder. The green body 10 has two opposing side surfaces 12 and a peripheral surface 14 extending therebetween. The green body 10 may have a through bore 16. The through bore 16 may extend between the side surfaces 12. The through bore 16 has a bore axis B about which the green body 10 may have 90° rotational symmetry. The peripheral surface 14 has four identical end surfaces 18 which face in four different directions. The end surfaces 18 may be recessed, thereby defining an undercut geometry. Each end surface 18 and each side surface 12 intersect at a major edge 20. Each end surface 18 has two major edges 20 and the green body 10 has a total of eight major edges 20. At least a portion of each major edge 20 forms a major cutting edge 22. Each major cutting edge 22 may extend over more than half the length of the major edge 20 on which it is formed.

Adjacent end surfaces 18 intersect at a minor edge 24. The minor edge 24 includes exactly two minor cutting edges 26 connected by an intermediate minor edge 28. The major cutting edges 22 are longer than the minor cutting edges 26. Each minor cutting edge 26 has an adjacent major cutting edge 22. Adjacent major and minor cutting edges 22, 26 have an associated corner cutting edge 30 that extends between the adjacent major and minor cutting edges 22, 26. In other words, adjacent major and minor cutting edges 22, 26 merge at a corner cutting edge 30. Each triplet of adjacent major and minor cutting edges 22, 26 and associated corner cutting edge 30 forms an insert cutting edge 32.

Each insert cutting edge 32 is formed at the intersection of two surfaces located on either side of the cutting edge 32. One surface is a rake surface 34, located in an end surface 18 and the other surface is a relief surface 36. The relief surface 36 associated the major cutting edge 22 is located in a side surface 12. The relief surface 36 associated the minor cutting edge 26 is located in an end surface 18 and the relief surface 36 associated the corner cutting edge 30 is located in a corner surface located between the side surface 12 and the end surface 18. Therefore, each triplet of major, minor and corner cutting edges 22, 26, of a given insert cutting edge 32 is associated with a specific rake surface 34 and a specific relief surface 36, namely the rake surface 34 and relief surface 36 at the intersection of which the insert cutting edge 32 is formed. The rake surface 34 may extend from the insert cutting edge 32 in an inward direction of the green body 10. The rake surface 34 may extend towards an inner end surface 38 of the end surface 18. In accordance with some applications, the rake surface 34 extends to the inner end surface 38 of the end surface 18. One of the two minor cutting edges 26 belongs to one of the adjacent end surfaces 18 and the other one of the two minor cutting edges 26 belongs to the other one of the adjacent end surfaces 18. Stated another way, one of the two minor cutting edges 26 of a given minor edge 24 is associated with a rake surface 34 in one end surface 18 and the other minor cutting edge 26 of the given minor edge 24 is associated with a rake surface 34 in an adjacent end surface 18.

As can be seen in FIG. 2, in a side view of the green body 10 the two side surfaces 12 are not aligned with each other but are rotated relative to one another about the bore axis B by a non-zero angle α. As can be seen in FIG. 3 in an end view of the green body 10 adjacent minor cutting edges 26, that is, minor cutting edges 26 located on a common minor edge 24, are spaced from each other by a distance d. Consequently, in an end view of the green body 10 the two minor cutting edges 26 formed on a common minor edge 24 are non-collinear. Moreover, the two minor cutting edges 26 and intermediate minor edge 28 formed on a common minor edge 24 are non-collinear.

Attention is now drawn to FIGS. 4 to 8 showing a tool set 40. The tool set 40 may be configured to compact a sinterable powder into the green body 10 shown in FIGS. 1 to 3. The tool set 40 has a central axis A which defines a reference axial direction. Radial directions are defined perpendicular to the central axis A. The tool set 40 may include a base body 42 on which a cover plate 44 is mountable. The cover plate 44 may have the form of a flat plate, for example a disc, and has a plate through hole 46 extending therethrough. The base body 42 is bounded by an outer base peripheral surface 48 and an inner base through hole 50. When the cover plate 44 is mounted on the base body 42 the central axis A passes through the plate and base through holes 46, 50. The base body 42 may have a plurality of radially directed punch channels 52 and a plurality of radially directed die channels 54. The punch channels 52 and the die channels 54 are arranged alternatingly and extend from the base peripheral surface 48 to the base through hole 50. The punch and die channels 52, 54 may be elongated in form. In accordance with some applications the base body 42 may have four radially directed punch channels 52, and four radially directed die channels 54.

Figure 4:
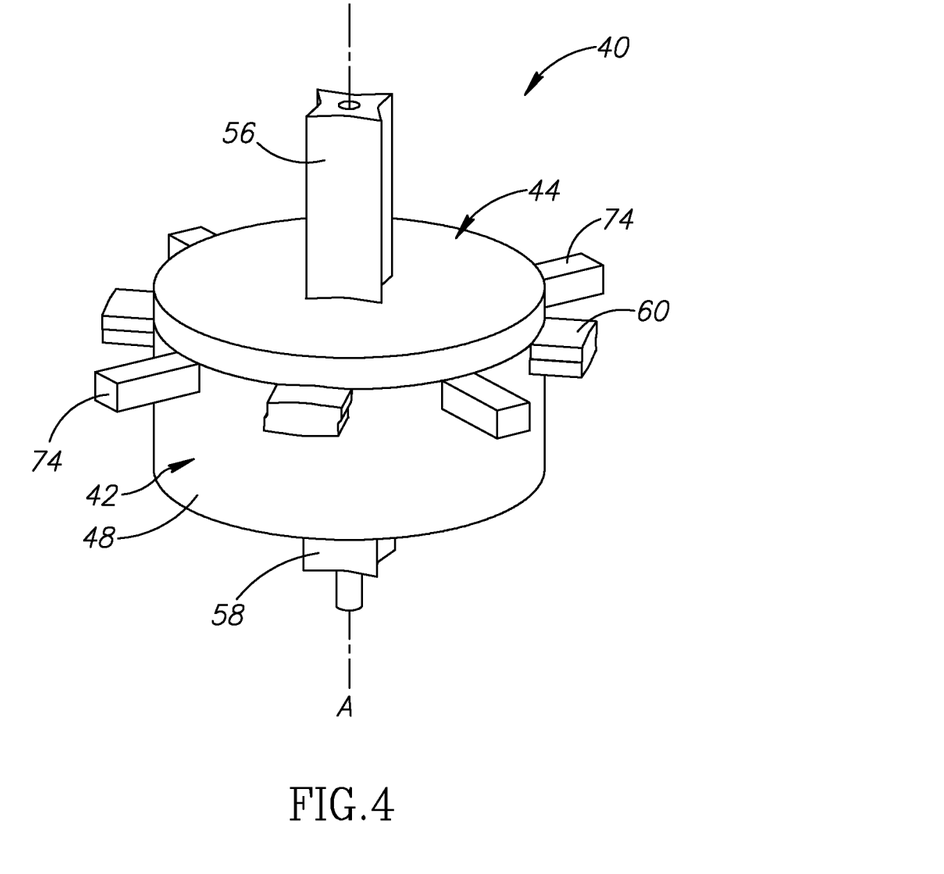
FIG. 4 is a perspective view of a tool set in accordance with the present invention.
Figure 5:
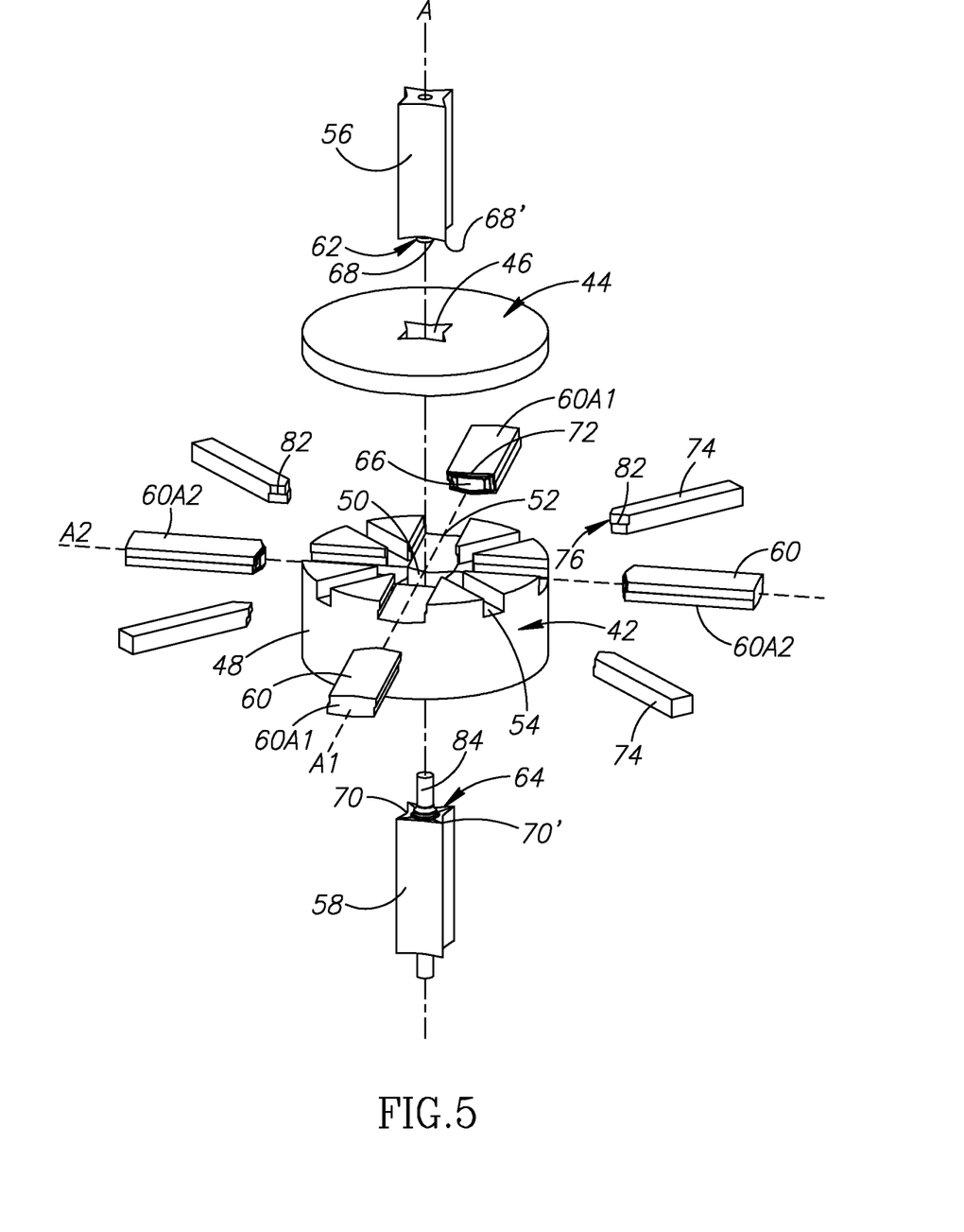
FIG. 5 is an exploded perspective view of the tool set of FIG. 4.

The tool set 40 has an upper punch 56, an opposing lower punch 58 and side punches 60 for compacting the sinterable powder into the green body 10. The upper and lower punches 56, 58 are configured and dimensioned to be slidingly received in the plate through hole 46 and base through hole 48, respectively. The side punches 60 are configured and dimensioned to be slidingly received in respective punch channels 52. In accordance with some applications there may be four side punches 60.

The upper and lower punches 56, 58 and the side punches 60 may have an elongated rod-like structure, each having at one end a punch face configured to come into contact with and compact the sinterable powder into the green body 10. The upper punch 56 has an upper punch face 62, the lower punch 58 has a lower punch face 64 and each side punch 60 has a side punch face 66. The upper punch face 62 is bounded by an upper punch peripheral edge 68, the lower punch face 64 is bounded by a lower punch peripheral edge 70 and each side punch face 66 is bounded by a side punch peripheral edge 72. Each punch face is configured to form a surface of the green body 10. The upper and lower punch peripheral edges 68, 70 can have upper and lower punch peripheral corner edges 68', 70', respectively, at corners of the upper and lower punch faces 62, 58. The tool set 40 also has die rods 74. Each die rod 74 has at one end a die front surface 76 comprising a forward die shaping surface 78 bounded by a die rod peripheral edge 80 and two die guiding surfaces 82 that diverge rearwardly from the die shaping surface 78. The die rod peripheral edge 80 can have die rod peripheral corner edges 80' at corners of the die shaping surface 78. The die shaping surface 78 of each die rod 74 is configured to form an edge of the green body 10 and the die guiding surfaces 82 are configured to guide adjacent side punches 60 during compaction of the sinterable powder. The die rods 74 are configured and dimensioned to be slidingly received in respective die channels 54. Each side punch 60 is located between two die rods 74 and conversely, each die rod 74 is located between two side punches 60. The die rods 74 may have an elongated rod-like structure. In accordance with some applications there may be four die rods 74.

In accordance with the specific application in which tool set 40 is configured to form the pre-sintered cutting insert green body 10, shown in FIGS. 1 to 3, the upper and lower punch faces 62, 64 face each other and are configured to form the side surfaces 12 of the green body 10. The side punch faces 66 are configured to form the end surfaces 18 of the green body 10. The die shaping surface 78 of each die rod 74 is configured to form a minor edge 24 of the green body 10. A center pin 84 may be used for producing the through bore 16 during the compaction of the green body 10. The center pin 84 may be located on the lower punch 58 and may extend in a direction towards the upper punch face 62.

The upper and lower punches 56, 58 are axially moveable along the central axis A. The upper punch 56 is axially moveable through the plate through hole 46, the lower punch is axially moveable through the base through hole 50, the side punches 60 are radially moveable in the punch channels 52 and the die rods 74 are radially moveable in the die channels 64. The side punches 60 and the die rods 74 are radially displaced from the central axis A and are disposed axially between the upper and lower punches 56, 58. The four side punches 60 may be arranged in two opposing pairs, first and second opposing pairs 60A1, 60A2, with the first opposing pair 60A1 moveable along a radially directed first side axis A1 and the second opposing pair 60A2 moveable along a radially directed second side axis A2. The first axis A1 may be perpendicular to the central axis A. The second axis A2 may be perpendicular to the central axis A. The first and second axes A1, A2 may be perpendicular to each other.

To manufacture the green body 10, the tool set 40 may be cycled through a number of configurations which may include, for example, an open configuration, a compaction configuration, a closed configuration and a removal configuration. In the open configuration the tool set 40 may hold the sinterable powder. In the compaction configuration the tool set 40 may be ready for compacting the sinterable powder. The closed configuration is the state of the tool set 40 after compaction of the sinterable powder. In the removal configuration of the tool set 40 the green body 10 may be removed from the tool set 40.

The compaction stages during the manufacture of the green body 10 may be associated with two configurations of the tool set 10. A first configuration, prior to compaction, corresponds to the compaction configuration and a second configuration, after compaction, corresponds to the closed configuration.

Figure 6:
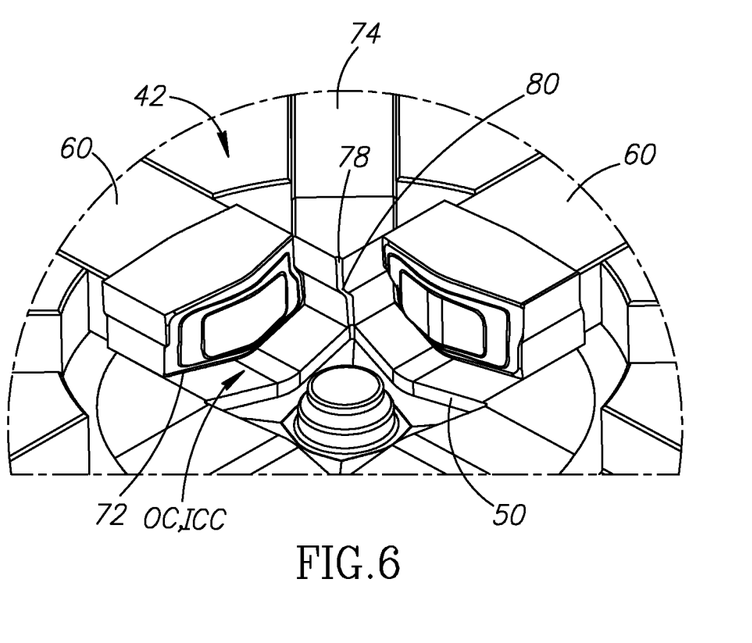
FIG. 6 is a partial view of the tool set in an open configuration.

FIG. 6 shows a partial view of the tool set 40 in an open configuration. FIG. 6 is a partial view for reasons of clarity so that the positions of the side punches 60 (only two shown) relative to the die rods 74 (only one shown) can be clearly seen. In the open configuration the side punches 60 are located in the punch channels 52, the die rods 74 are located in the die channels 54 and the lower punch 58 is located in the base through hole 50. Not seen in FIG. 6 are the upper punch 56 and cover plate 44 which are spaced apart from the base body 42 in the open configuration. Each die rod 74 is located in a die rod final position. In the die rod final position the die shaping surface 78 of each die rod 74 is located adjacent the base through hole 50. The die rod final position is the position of the die rods 74 during compaction of the sinterable powder. The lower punch 58 is located in the base through hole 50 in a lower punch initial position. In the lower punch initial position the lower punch 58 is located in the base through hole 50 but does not completely fill the base through hole 50. That is, the base through hole 50 is partially exposed. The side punches 60, the die rods 74 and the lower punch 58 form an open cavity OC of the tool set 40. The open cavity OC may hold the sinterable powder.

In accordance with some embodiments, in the open configuration, each side punch 60 is located between two die rods 74 in a side punch initial position. In the side punch initial position each side punch 60 may be in contact with the die guiding surfaces 82 of adjacent die rods 74. In the side punch initial position the side punches 60 are radially offset, or remote, from the base through hole 50 and the die rods 74 are adjacent the base through hole 50. The side punch initial position will also be referred to herein as a first position of the side punch 60.

The compaction configuration of the tool set 40 may be obtained from the open configuration by placing the cover plate 44 on the base body 42 with the upper punch 56 located in the plate through hole 46 as shown in FIG. 4. In the compaction configuration the upper punch 56 is located in an upper punch initial position. In the upper punch initial position the upper punch 56 is located at least partially in the plate through hole 46 and the upper punch 56 is spaced apart from the side punches 60. In the compaction configuration the presence of the cover plate 44 and upper punch 56 turns the open cavity OC into an initial closed cavity ICC. Since the compaction configuration may be obtained from the open configuration, the arrangement of the side punches 60, die rods 74 and lower punch 58 in the compaction configuration is as shown in FIG. 6. The arrangement of the upper punch 56 is as described herein above. The initial closed cavity ICC is indicated in FIG. 6 in which the upper punch 56 is not shown. The initial closed cavity ICC is formed by the die rods 74 and the upper, lower and side punches 56, 58, 60.

In embodiments in which the tool set 40 is configured to compact the green body 10 shown in FIGS. 1 to 3, the upper and lower punches 56, 58 are rotated relative to one another about the central axis A by an angle $\alpha$. This arrangement ensures that the upper and lower punch faces 62, 64 are rotated relative to one another about the central axis A by an angle $\alpha$ so that the two side surfaces 12 of the green body 10 will be rotated relative to one another about the bore axis B by the angle $\alpha$.

Figure 7:
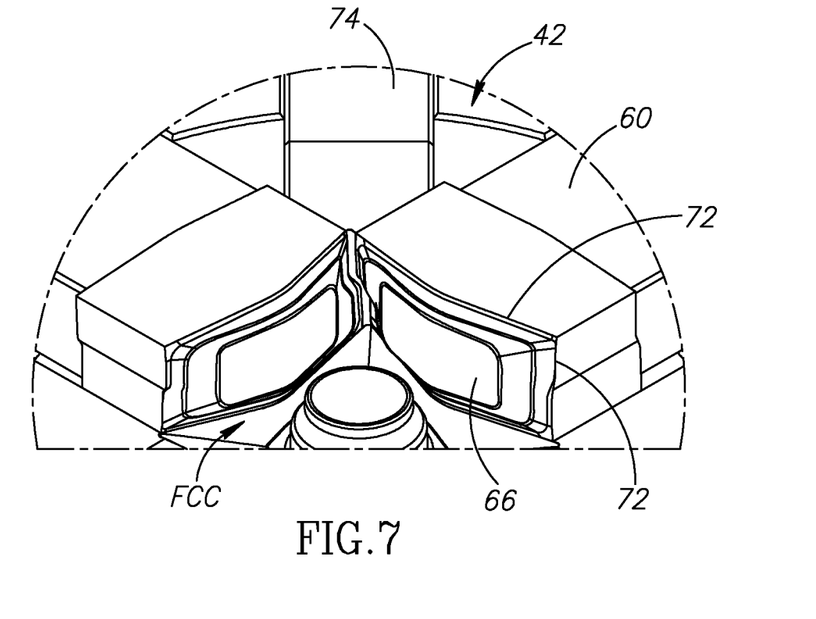
FIG. 7 is a partial view of the tool set in a closed configuration.

FIG. 7 shows a partial view of the tool set 40 in a closed configuration. FIG. 7 is a partial view for reasons of clarity. The upper punch is not shown so that the positions of the side punches 60 (only two shown) relative to the doe rods 74 (only one shown) and the lower punch 58 can be clearly seen. In the closed configuration, each die rod 74 is located in the die rod final position, and the upper, lower and side punches 56, 58, 60 are located, respectively, in upper, lower and side punch final positions. The closed configuration may be obtained from the compaction configuration urging the upper and lower punches 56, 58 towards each other and by urging the opposing pairs of side punches 60A1, 60A2 towards each other. As the side punches 60 move towards each other they slide on adjacent die guiding surfaces 82 which guide each side punch 60 to the side punch final position. The side punch final position will also be referred to herein as a second position of the side punch 60.

In the closed configuration, the die rods 74 and the upper, lower and side punches 56, 58, 60 form a final closed cavity FCC. The final closed cavity FCC is bounded by the upper, lower and side punch faces 62, 64, 66 and by the die shaping surfaces 78. In the closed configuration, the side punch peripheral edges 72 are in contact with adjacent die rod peripheral edges 80 and the upper and lower punch peripheral edges 68, 70 are in contact with adjacent side punch peripheral edges 72. The upper and lower punch peripheral corner edges 68', 70' are in contact with respective die rod peripheral corner edges 80'. The side punch and die rod peripheral edges 72, 80 that are in contact with each other are shaped to have matching geometries so that they fit together with no gaps between them. Similarly, the upper and lower punch peripheral edges 68, 70 and the side punch peripheral edges 72 that are in contact with each other are also shaped to have matching geometries so that they also fit together with no gaps between them.

In the side punch final position, the side punches are adjacent the base through hole 50 with the side punch peripheral edges 72 in contact with adjacent die rod peripheral edges 80. In the lower punch final position the lower punch 58 is located in the base through hole 50 completely filling the base through hole 58. That is, none of the base through hole 50 is exposed. The final closed cavity FCC is smaller than the initial closed cavity ICC. The final closed cavity FCC forms the shape of the green body 10. In the closed configuration, the die shaping surfaces 78 the upper, lower and side punch faces 62, 64, 66 are in contact with respective surfaces of the green body 10.

Figure 8:
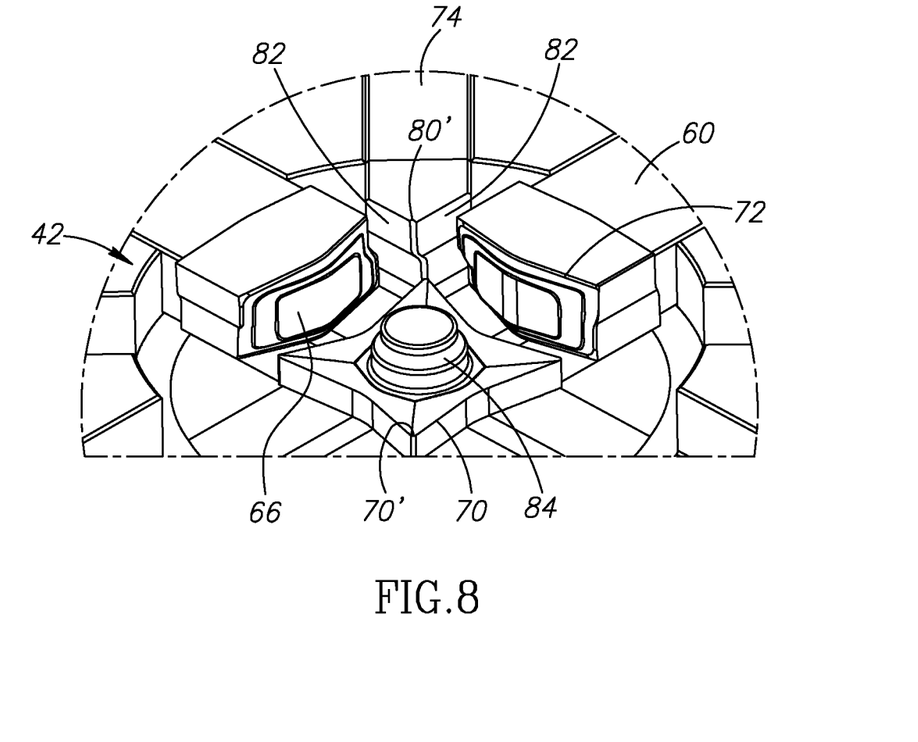
FIG. 8 is a partial view of the tool set in a removal configuration.

The removal configuration is shown in FIG. 8. The removal configuration may be obtained from the closed configuration by removing the upper punch 56 and cover plate 44, by withdrawing the die rods 74 to a die rod removal position and by withdrawing the side punches 60 to a side punch removal position. In the die rod and side punch removal positions, the die rods 74 and the side punches 60 are no longer adjacent the base through hole 50 and no longer engage the green body 10. In other words, in the removal configuration the die rods 74 and the side punches 60 are in a position remote from the green body 10. After bringing the die rods 74 and the side punches 60 to the die rod and side punch removal positions the lower punch 58 is moved to a lower punch removal position. In the lower punch removal position, the lower punch 58 protrudes from the base through hole 50 (see FIG. 8) and the green body 10, which is located on the lower punch face 64 can easily be removed from the tool set 40.

A method for manufacturing a green body, for example green body 10 shown in FIGS. 1 to 3, comprises a number of steps in which the configuration of the tool set 40 is altered so that sinterable powder can be introduced into the tool set 40, compacted into the green body 10 and then removed from the tool set 40. For example, one step may involve establishing an initial closed cavity (ICC) between the upper and lower punches (56, 58), the side punches (60) and the die rods (74), with a predetermined amount of sinterable powder located in the initial closed cavity (ICC). Another step may involve deriving a final closed cavity (FCC) from the initial closed cavity (ICC) by urging the upper and lower punches (56, 58) towards each other and by urging the side punches (60) of opposing pairs of side punches (60) towards each other with each two adjacent side punches (60) moving slidably on the die guiding surfaces (82) of the common die rod (74) whilst maintaining the die rods (74) stationary with respect to the side punches (60) thereby compacting the sinterable powder to form the green body (10) A final step may involve bringing the tool set (40) to a removal configuration by removing the upper punch (56) and the cover plate (44) from the base body (42), withdrawing the die rods (74) and the side punches (60) to a position remote from the green body (10) and bringing the lower punch (58) to a lower punch removal position wherein the lower punch (58) protrudes from the base through hole (50) thereby enabling removal of the green body (10).

Although the present invention has been described to a certain degree of particularity, it should be understood that various alterations and modifications can be made without departing from the scope of the invention as hereinafter claimed.

What is claimed is:

1. A tool set (40) configured to compact a sinterable powder to form a green body (10), the tool set (40) having a central axis (A) defining axial and radial directions, the tool set (40) comprising:
   a base body (42) having a base through hole (50), a plurality of radially directed punch channels (52) and a plurality of radially directed die channels (54);
   a cover plate (44) mountable on the base body (42), the cover plate (44) having a plate through hole (46), the central axis (A) passing through the base and plate through holes (50, 46) when the cover plate (44) is mounted on the base body (42);
   an upper punch (56) and an opposing lower punch (58), the upper punch (56) being axially moveable through the plate through hole (46), the lower punch (58) being axially moveable through the base through hole (50);
   a plurality of side punches (60) arranged in opposing pairs, the side punches being radially moveable in the punch channels (52); and
   a plurality of die rods (74) radially moveable in the die channels (54), each die rod (74) being common to and located between two adjacent side punches (60), each die rod (74) having a forward die shaping surface (78) and two die guiding surfaces (82) diverging rearwardly therefrom;
   wherein
   the two adjacent side punches (60) are slidably moveable on the die guiding surfaces (82) of the common die rod (74).

2. The tool set (40) according to claim 1, configured to be adjusted from a first configuration prior to compaction of the sinterable powder to a second configuration after compaction of the sinterable powder, wherein in the second configuration the upper, lower and side punches (56, 58, 60) and the die rods (74) form a closed cavity (CC).

3. The tool set (40) according to claim 2, wherein the upper, lower and side punches (56, 58, 60) have respectively upper, lower and side punch faces (62, 64, 66) and the closed cavity (CC) is bounded by the upper, lower and side punch faces (62, 64, 66) and by the die rod shaping surface (78).

4. The tool set (40) according to claim 1, configured to be adjusted from a first configuration prior to compaction of the sinterable powder to a second configuration after compaction of the sinterable powder, wherein in the first configuration the side punches (60) are remote from the base through hole (50) and in the second configuration the side punches (60) are adjacent the base through hole (50), the arrangement being such that the die rods (74) are located adjacent the base through hole (50) in both the initial and final configurations.

5. The tool set (40) according to claim 1, wherein at least one of the upper punch and lower punch comprises a center pin (84) for producing a through bore (16) in the green body (10).

6. The tool set (40) according to claim 1, wherein the upper punch face (62) and the lower punch face (64) are rotated relative to one another about the central axis (A) by a non-zero angle ($\alpha$).

7. A combination comprising the tool set as in claim 1 and a green body (10) formed by compaction of a predetermined amount of sinterable powder in a closed cavity of the tool set, which closed cavity is formed by the upper, lower and side punches (56, 58, 60) and the die rods (74).

8. The combination as in claim 7, wherein each die rod (74) comprises at least one die shaping face (74), each die shaping surface (78) forms a minor edge (24) of the green body (10).

9. The combination as in claim 8, wherein the minor edge (24) comprises two minor cutting edges (26) and in an end view of the green body (10), the two minor cutting edges (26) are non-collinear.

10. The combination as in claim 8, wherein the green body (10) comprises two opposing side surfaces (12) and a peripheral surface (14) extending therebetween, the peripheral surface (14) comprises four identical end surfaces (18) and adjacent end surfaces (18) intersect at the minor edge (24).

11. The combination as in claim 10, wherein:
   each side punch (60) has a protruding side punch face (66), and
   the green body (10) has recessed end surfaces (18) formed by the protruding side punch faces (66) during compaction of the sinterable powder.

12. The combination as in claim 11, wherein the upper punch (56) has an upper punch face (62) and the lower punch (58) has a lower punch face (64), and wherein the upper and lower punch faces (62, 64) form the side surfaces (12) of the green body (10) during compaction of the sinterable powder.

* * * * *